United States Patent [19]
Martensson et al.

[11] 3,820,303
[45] June 28, 1974

[54] PACKAGING MACHINE
[75] Inventors: Kjell Halvard Martensson; Björn H:Son Linde; Jan Frederik Palsson; Sven Torsten Jerre, all of Lund, Sweden
[73] Assignee: Tetra Pak International AB, Lund, Sweden
[22] Filed: July 19, 1972
[21] Appl. No.: 273,334

Related U.S. Application Data
[62] Division of Ser. No. 227,812, Feb. 22, 1972, Pat. No. 3,785,113.

[30] Foreign Application Priority Data
Mar. 25, 1971 Sweden.............................. 3864/71

[52] U.S. Cl..................................... 53/186, 53/373
[51] Int. Cl....... B65b 3/02, B65b 7/06, B65b 51/32
[58] Field of Search ............. 53/186, 375, 201, 388, 53/373, 183; 93/49 R, 55, 39.2, 59 R, 50 CE

[56] References Cited
UNITED STATES PATENTS
2,766,571 10/1956 Bryce................................ 53/388 X
2,841,942 7/1958 Wills et al............................ 53/375
3,200,557 8/1965 Schwenk............................ 53/373 X
3,248,841 5/1966 Heffelfinger et al............... 53/375 X
3,535,848 10/1970 Gellatly et al..................... 53/375 X
3,619,979 11/1971 Martensson et al.............. 53/375 X
3,699,743 10/1972 King et al. ........................... 53/186
R26,699 10/1969 Austin, Jr. et al................. 93/59 CE Primary Examiner—Travis S. McGehee
Assistant Examiner—Horace M. Culver
Attorney, Agent, or Firm—Pierce, Scheffler & Parker

[57] ABSTRACT
A packaging machine by which package blanks are erected into packages having top closure elements, said packages being arranged in two parallel lines and filled with a liquid and are then passed in the parallel lines through a sealing station having one pair of sealing jaws for each line, the outer jaw of each pair being substantially fixed and the inner jaw of each pair being movable toward the associated fixed jaw by a vertically movable horizontal shaft connected by link arms to the movable inner jaws whereby when the shaft is raised or lowered each inner jaw moves laterally toward the associated fixed jaw for sealing the heated top closure elements said jaws being cooled so as to cool the sealed top elements of the packages in each of the parallel lines.

2 Claims, 13 Drawing Figures

PACKAGING MACHINE

This is a division, of application Ser. No. 227,812 filed Feb. 22, 1972, and now U.S. Pat. No. 3,785,113.

The present invention refers to a packaging machine for the production of filled and closed packages from blanks of material lined with thermoplastic, e.g., plastic lined cartons, which are prepared in advance and are provided with crease lines to facilitate the production of folds, whereby the said packaging machine comprises intermittently rotatable stud wheels which carry studs, arrangements for the erection of package blanks in tubular form and for feeding the erected package blanks onto the studs, devices for shaping and sealing of a base on the package blanks fed onto the studs and securing devices preferably provided on a conveyor which is capable of moving in the horizontal plane, an arragement for moving the package blanks processed on the studs and provided with a base to the retaining devices on the said conveyor as well as devices for folding, filling and closing the packages lowered into the said retaining devices.

In the field of packaging technology it has long been known how to make packages with a so-called "gable top." They are produced in almost all cases from prepared blanks which are advantageously provided with a crease line pattern in order to facilitate the erection of the packages and their shaping by folding of the panels forming the top and the base to their final position. The said package blanks are nowadays generally lined with a thermoplastic material such as polythene, whereby the thermoplastic layer serves, on the one hand, in order to make the package impermeable to liquids, and, on the other hand, in order to seal the package with the aid of heat and pressure so that it is permanently held together in the erected position.

The said packages have found their most important use as packages for liquids, in particular for milk, and various machines have been designed for the production of the packages. Packaging machines comprising indexable stud wheels on the studs of which previously produced package blanks are arranged to be mounted and on which the package blanks are provided with a base while the studs pass a number of processing stations are as such known, and it has also been previously known how to transfer the completely processed package containers from a stud wheel to a conveyor which removes the package containers along a track, whereby the sections forming the top of the package containers are folded, the package containers are filled with the intended charge whereupon the said sections forming the top are finally folded inward over the openings of the filled package containers and are sealed in a permanent manner.

The disadvantages of the hitherto known packaging machines of this type were due to the fact that the production capacity of each production line is low. A considerable improvement in this respect can be achieved by a packaging machine in accordance with the invention which is characterised in that the stud wheels are arranged in pairs parallel to one another and are so arranged that a synchronous intermittent rotary movement is imparted to them by a common drive unit, in that the axis or axes of rotation are located vertically above the conveyor belonging to the pair of stud wheels and in that the plane of rotation of the stud wheel is perpendicular to the plane of motion of the conveyor. The reason why improvements can be brought about by a machine in accordance with the invention consists in that two or more stud wheels can be associated with one and the same conveyor track inasmuch as the stud wheels are located transverse to the conveyor or conveyor track. If a number of stud wheels located in a conventional manner were to be associated with one and the same conveyor track, the said track would come to be very long owing to the considerable diameter of the stud wheels and all processing stations and their drives would, in addition, have to be duplicated. On the other hand, with the arrangement of the stud wheels in accordance with the invention, the drive of the processing stations need not be duplicated since the stud wheels are located close to one another and parallel to one another.

A further advantage of the packaging machine in accordance with the invention consists in the fact that package blanks of different standard lengths may be used without setting of any stop lugs on the studs since the machine is provided with an automatic container stop with the aid of which the position of the containers on the studs is adjusted in such a way that the containers are located correctly. This device for adjusting the position of the package blanks on the studs is characterised by pivotable wings arranged at a distance from one another which are so equipped that they can be swung towards one side face of a stud fed towards the middle of the device.

A further advantage of the packaging machine in accordance with the invention consists in that the arrangement for heating the sections which form the base does not have to be raised and lowered during each operation, since the said arrangement is provided with a deflector which distributes hot air in the required manner along the surface of the sections forming the base. The said heating device is characterised in that it is provided with a heating chamber in which air is heated to a temperature above the plastification point of the thermoplastic material, in that the said heating chamber is bounded by holes or ducts which are provided to pass through and direct a current of hot air coming from the heating chamber, and in that a deflector is provided, which possesses a number of oblique wall faces so arranged as to deflect the current of hot air from at least some of the said holes or ducts so that this current of hot air is given a substantially different direction than the one in which it flowed directly after passing through the holes.

A further advantage of the packaging machine in accordance with the invention consists in that the base sections are folded inward by means of a folding device without drive, which is characterised in that the said device is provided with a first and a second rotatably located folding arm, both of these folding arms being rotatably located in a common base which is rigidly connected with the engine base, whereas the said folding arms are mutually connected by means of a link rotatably located in the two folding arms, this link being so arranged so to transmit the movement of the said first folding arm to the said second folding arm in such a way that the first folding arm acts on the second folding arm in the course of its movement.

A further advantage of the packaging machine in accordance with the invention consists in that the top sealing operation can be carried out by means of link controlled movable sealing jaws, which are characterised in that the said sealing device has two pairs of pressure jaws each with a movable and a fixed pressure jaw, the said pairs of pressure jaws being so arranged as to operate synchronously, in that the movable pressure jaws in each pair of pressure jaws are joined to one another by means of linkage arms which are rotatably located in one or the other of the movable pressure jaws, and by a joint, mainly horizontal shaft which is to arranged that it can be located in a first and in a second position in the vertical plane, whereby the pair of pressure jaws is closed when the said shaft is in its first, upper position, and the pressure jaws are open when the said shaft is in its lower, second position.

A particularly advantageous embodiment of the invention is described below with reference to the attached diagrammatic drawing in which.

Figure 9:
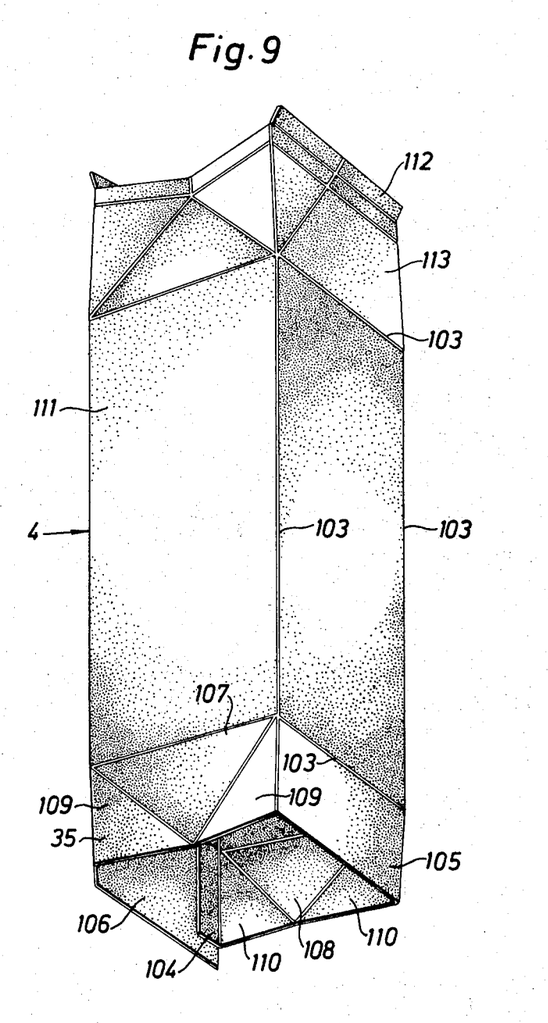
FIG. 9 shows a package blank.

With the packaging machine in accordance with the invention packages are produced from previously manufactured package blanks consisting of carton lined with thermoplastic or a similar material. An example of such a package blank is shown in FIG. 9 where the package blank 4, which in the initial position is flat, has been erected so as to form tube with square cross-section. The production of the package blank 4 is effected by stamping out a sheet of the carton material lined with plastic along the desired lines, possibly after printing, and by providing crease lines 103 which facilitate folding of the package blank. After stamping of the carton blank its two longitudinal edges are joined so as to form a longitudinal joint 104 so that the package blank can be erected in tubular form.

The base end 35 of the package blank 4 is provided with two relatively large, rectangular base end sections 105 and 106 and with two smaller triangular base end sections 107 and 108, which are connected with the larger sections 105 and 106 by means of the fold-back sections 109 and 110. All the said end sections are separated from one another and from the container body 111 by means of the crease lines 103 provided in the packaging material and facilitating the folding process.

The upper part 113 of the package blank has basically the same folding pattern as the base part, but since the top part is not to be folded so as to form a flat top but a so-called gable top, the dimensions and angles of the sections forming the top are different.

The section 113 forming the top is also joined to the sealing section 112, which is so designed as to be joined in a flat fin, in which the sealing sections are sealed to one another so as to form a tight and durable sealing joint.

Both the top part and the base part are formed in essentially the same manner, and for simplicity's sake only the folding operation for the base part will be described here, which is effected in such a way that the smaller, triangular sections 107 and 108 are folded inward over the aperture of the package blank, whereupon the larger sections 105 and 106 are also folded inward over the aperture of the package blank, while at the same time the fold-back sections 109 and 110 are folded inward towards the triangular sections, so that on completion of the folding operation they are between and in contact with the smaller and the larger sections, in which position the sections are sealed to one another with the aid of heat and pressure.

As mentioned above, the top part of the package is formed in essentially the same way but with the difference that, owing to their dimensions, the sections forming the top cannot be folded entirely inward over the aperture of the container but only to a position, in which the sections which face each other in pairs, meet one another. The sealing sections 112 are folded towards one another so as to form a flat fin, whereby the smaller sealing sections are folded inward, in the manner of a bellows, between the larger.

Figure 1:
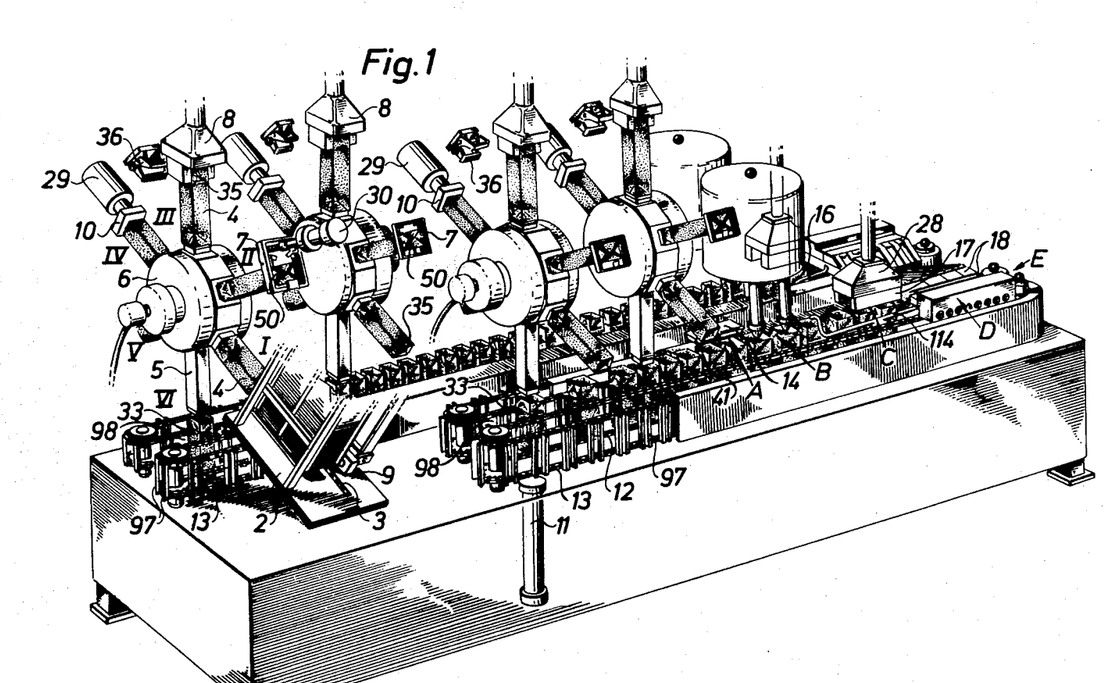
FIG. 1 shows a perspective view of the machine.
Figure 2:
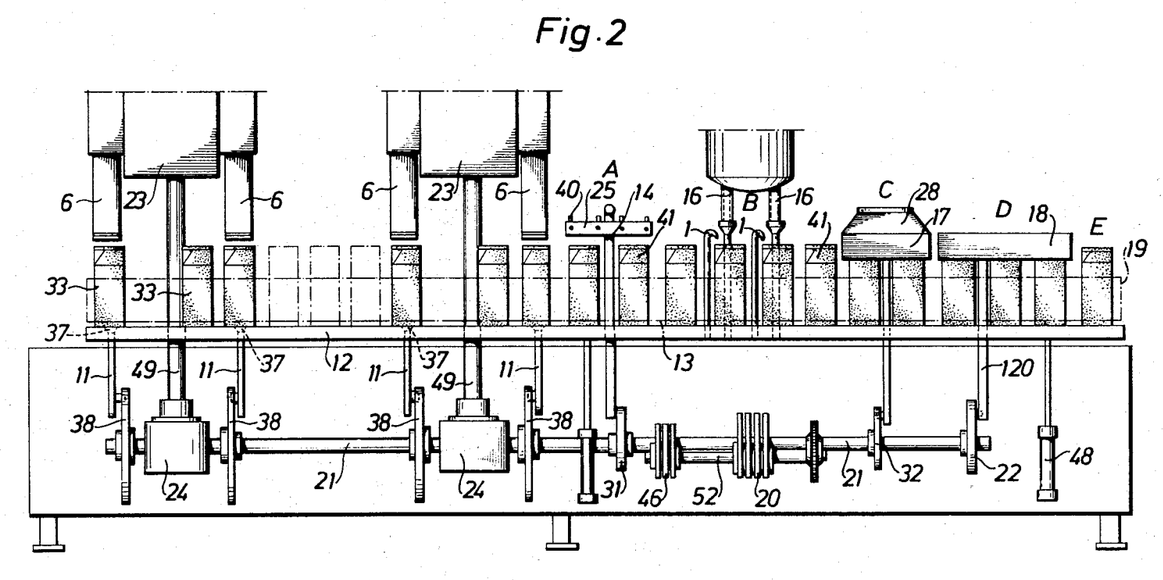
FIG. 2 shows a diagrammatic side view of the machine.

For the sake of clarity, the packaging machine is described below initially in general terms, mainly with reference to FIGS. 1 and 2 of the drawing, whereupon certain constructional parts or elements which co-operate with one another and are characteristic of the machine in accordance with the invention are described separately.

GENERAL DESCRIPTION OF THE MACHINE

The flat package blanks 4, which have not yet been erected, are discharged from the magazine 2 while at the same time the package blanks 4 are erected in a tubular form, which in the present case has a square cross-section.

By means of the feeder device 3, which consists of a rotatable chain provided with carriers 9, the erected package blanks 4 are pushed onto a stud 5 provided on the stud wheel 6, the said stud having been moved in position opposite the feeder device. (In the drawing this position is designated I). Once the package blank 4 has been pushed onto stud 5, the stud wheel 6 is indexed, and since the indexing angle in the present case amounts to 60°, the stud wheel rotates by 60° in a counter-clockwise direction until it reaches position II, whereupon the stud wheel stops again.

In position II, the base end 35 of the package blank 4 mounted on stud 5 is centrally opposite a folding device 7 controlled by an actuator 30, preferably a pneumatic cylinder. With the aid of the actuater 30, the folding device 7 is moved towards the base section 35 of the package blank 4, the said base section projecting from stud 5, whereby flaps 50 of the folding device 7 are folded inward towards the base section of the package blank 4 with a view to folding or "breaking" the crease lines previously provided in the base section of package blank 4. The folding process is, however, interrupted before the wall section of the package blank, which forms the base, has been completely folded inward to its final position, and owing to the elasticity of the material, section 35 of package blank 4 which projects from stud 5 returns substantially to the position in which it was prior to the folding operation.

When the folding operation is completed, the stud wheel 6 is again indexed and stops in position III, in which position the folded end section 35 of package blank 4 is centrally opposite a heating device 8. Through the heating device 8 hot gas, preferably air, is blown against the raised end section 35 of package blank 4, whereby the elements of the end section, which are intended to act as sealing sections are heated to such an extent that the thermoplastic liner softens. Thereupon the stud wheel 6 is again indexed and moves to position IV.

While the stud wheel 6 with stud 5 moves from position III to position IV, section 35 of package blank 4 projecting from stud 5 comes into contact with a folder 36 which puts together two opposite sides 105 and 106 of the end wall section of package blank 4, while the two remaining end wall sections 107 and 108 are folded between the above mentioned end wall sections in the manner of a bellows. When the stud 5 has reached position IV, a cooled pressure plate 10, which can be displaced by an actuater 29, preferably a pneumatic cylinder, is pressed against the folded base section, whereby a substantially plane package base is formed. By cooling the heated parts of the end section 35 at the same time as the sections of package blank 4 which form the base are pressed together between the pressure plates 10 and the end of stud 5, the heated thermoplastic layer is caused to stiffen once the heated faces have been combined by surface fusion, whereby the sections forming the base are held together in the compressed position so as to form a plane, liquid-proof base. In order to ensure a good seal it is important for the folded base sections to be pressed against one another with great force, and it is advisable to make use of pressures up to several tons, since pressures of this magnitude cause effective flow of the plastic in the sealing zone and closure of any leakage channels which may occur when overlapping layers of material are joined.

Once the base has been pressed on the stud wheel is indexed to position V, for which position no operation is provided, so that the container 33 which has been given a base is turned, after a period of time corresponding to one indexing period, to position VI, in which the stud 5 is directed downward.

In position VI the container 33 is pulled from stud 5 by means of a pull-off device 11 which is vertically deplaceable and has at its front part a suction head 37, which can be connected to a vacuum source not shown here.

The pulling-off operation is effected by raising the pull-off device 11 with the aid of an actuater 38 until its suction head 37 comes into contact with the plane base of container 33. When the suction head 37 has come into contact with the base or before this contact is brought about, the suction head is connected with a vacuum source not shown here, as a result of which the suction head is attached to the base of container 33. When the pull-off device 11 is thereafter caused to move downward, the container 33 is pulled from stud 5 and lowered between the retaining devices which are arranged on an intermittently movable chain conveyor 13, by means of which the containers 33 pulled from the stud wheel 6 are cuased to be transported in a substantially horizontal direction.

The stud wheel 6 is indexed after completion of the pull-off operation to position I, in which a fresh package blank 4 is pushed on stud 5 by the feeder device 3.

In the above description a method of operation has been reported in which a stud wheel 6 carries out a complete indexing cycle, but during each indexing pause operations are of course carried out in all positions with the exception of position V, and this means that a completely processed container 33 is pulled off during each indexing pause while at the same time a fresh package blank 4 is mounted on stud 5. Naturally the time between two consecutive indexing operations must be so selected that all operations in the various positions can be completed.

Since two or more stud wheels 6 are simultaneously associated with a conveyor 13, two or several containers 33 provided with a base are at all times transmitted from the stud wheel 6 to the conveyor 13 by means of two or more pull-off devices 11. With the machine here described each conveyor 13 is associated with two stud wheels 6, so that two containers 33 provided with a base are transmitted to the conveyor 13 during each indexing operation. Since the conveyor is supplied with two containers 33 during each indexing operation, the container must be moved by two package divisions during each indexing operation, and all processing stations for folding the tops of the containers and for filling and closing the containers 33 must be duplicated. However, since the said processing stations are situated in lateral juxtaposition, a common drive mechanism can be used for each pair of devices.

Each conveyor 13 consists of two parallel endless chains which are provided with retaining devices 97 whereby the retaining devices located centrally opposite one another on the two chains form between them a space 98 which is so designed that an upright container 33 can be placed within it. When a container 33 is pulled from stud 5 by the pull-off device 11 and moved downward, it is introduced between the two chains 13 and into the space 98 defined by the retaining devices 97. For this to be possible, the movement of the conveyor chain must of course be synchronised with that of the stud wheel so that the conveyor chain 13 moves forward by two retaining device divisions during each indexing operation of the stud wheel 6 while fresh empty spaces bounded by the said retaining elements 97 are always directly below the studs 5 in position VI.

When the container 33 is introduced into the space defined by the retaining devices 97, the suction head 37 releases its hold and is separated from the container 33 which is now in position within the holding devices 97 connected to the conveyor chain 13. As stated above, the conveyor chain is, during each indexing operation, moved on in stages towards the right in FIGS. 1 and 2, whereby the height position of the container 33 is determined by causing their bases to slide along a track 12 the height of which is adjustable.

At station A the top section of the containers is folded by means of a folding device 14 attached to a yoke 25 which can be raised and lowered. The folding operation is effected by folding the triangular flaps 40 which form part of the folding device 14 inwards against two opposite triangular side sections of top section 41, while at the same time the remaining side sections are folded inward over the aperture of the container and take up between themselves the two said triangular sections. However, folding has only the purpose of bending or "breaking" the crease line pattern which has been provided on the package blank and which is intended to define the folding pattern necessary for sealing the top of the container, and hence the folding operation is not completed but the folding device 14 is raised to its upper position once the crease line pattern has been bent.

After indexing of the stud wheel 6 and displacement of the conveyor chain 13 by one stage, the folded containers 33 are at station B, i.e., directly below the charging device 16, by means of which a measured quantity of the charge is introduced into the containers. Filling of the containers 33 is effected in such a way that the containers are raised about the filling tubes 16 by means of lifting devices 1 which grip the upper edge of the containers, while they are controlled in a sideways direction by the retaining devices 97, whereupon the containers 33 are again lowered to their original position by means of the lifting devices 1 in the course of charging. Thereafter the filled containers are moved in stages and synchronously with the indexing mechanism to station C, where the aperture of the container is directly below the top heating device or "top heater" 17. Just like the base heating device 8, the top heating device 17 consists of a heating device provided with holes, whereby hot air is blown through the said holes which are arranged in such a pattern that the heat reaches only those parts of top section 41 which are intended to be sealed against one another. The hot air is obtained by burning a combustible gas in a special combustion chamber, whereupon air is blown through the combustion chamber and out through the holes provided in the heating device. Heating of the sealing sections of top section 41 of container 33 is effected in such a way that the top heating device 17 is lowered into and over the top sections of the containers 33, whereby the heated air, which is blown out through the said holes, impinches on the sealing sections lined with thermoplastic material mainly at a right angle. The thermoplastic material is quickly heated to the point of plastification whereupon the top heating device 17 is raised to a position outside the apertures of the containers 33, and the containers 33 are moved from station C to station D, while the sealing section of top section 41 is folded inward over the apertures of the containers with the aid of control tracks 114. Folding inward of the top sections 41 of containers 33 is effected in such a way that the said triangular sections are folded inward in the manner of a bellows between the outer sections forming the top whereby the sealing sections are combined in a fin which at station D is pressed between co-operating pressure jaws 18, which are cooled. Since the plastic is heated at the commencement of the sealing operation, the surfaces between the combined heated plastic layers are fused, as the result of which the sealing action which is achieved after compression and cooling at station D is very powerful. After station D a further station may be provided, at which station labelling, date marking or similar operations may be carried out with the aid of stamping mechanisms, embossing mechanisms, labelling devices etc.

At station E at the end 19 of the conveyor chain the retaining devices which surrounded the containers during transportation by means of chain 13 are separated and the completed packages are removed from the packaging machine.

The packaging machine is driven with the aid of an electric motor, which may be provided with a gearbox of wormwheel or spurwheel type. The output shaft of the motor is connected by means of a belt to a mitre gear, the output shaft 52 of which drives the main shaft 21 of the machine by means of a transmission chain. On the shaft 52 are provided cams 20 with the aid of which the pump pistons of the filler device 16 are actuated.

Since a packaging machine is designed for the production of packages of different heights and hence of different volumetric content, there are several different cams (in the present example four, since the packaging machine is intended for the production of four different package sizes), which are so arranged that the desired cam can be moved into the working position. On shaft 52 there is also another set of cams 46 by means of which the lifting devices 1 are driven and controlled. Since the packaging machine here described has twin-conveyor tracks 13 with appropriate stud wheels and processing stations, a further shaft 52 with appropriate cams 20, 46 is found on the other side of the main shaft 21.

The main shaft 21 drives two mitre gears 24 the output shafts 49 of which drive the indexing mechanisms 23 of the stud wheel. The main shaft 21 also drives the cam discs 38 fof the pull-off devices 11, the cam disc 31 of the folding device 14 and the cam disc 32 of the top heater 28.

The sealing jaws 18 can be driven either by means of cam disc 28 which is associated with main shaft 21 or with the aid of a separate drive cylinder.

After this introductory general description of the packing machines's operation, a more detailed description is given below in order to describe some of the vital systems of the packaging machine and the manner in which these systems co-operate with a view to achieving the desired result, i.e., a cheap and rapid packaging machine which in addition exhibits good operational characteristics.

(A) SYSTEM FOR ADJUSTING THE POSITION OF THE PACKAGE BLANKS ON THE STUDS

With packaging machines of the type described above previously produced package blanks 4 are erected in tubular form, whereupon they are pushed onto a stud 5. In order to be able to use only one type of studs, all package blanks 4 have the same cross-sectional area, as the result of which all packages have the same base format and cross-sectional area. In order to be able to vary the size of the packages it is therefore necessary to vary the height of the packages and package blanks of different height are therefore provided.

As previously mentioned the package blanks 4 are moved so far over the studs 5 that the ends with the section 35 forming the base project beyond the front edges of the studs. Since the sections 35 forming the base are to be folded along prepared crease lines 103, their crease lines must therefore substantially coincide with the fed front edges of the studs.

Feeding of the studs is effected by means of a previously described arrangement which comprises a.o., an endless chain 3 with carriers 9. This mounting or feeding action of the package blanks 4 on studs 5 is of course effected in such a way that the package blanks are located on the studs in a substantially correct position, but since it is important for the package blanks to be located in an exactly correct position and since they must not be pushed further over the studs 5 during the subsequent operations it is necessary to provide the studs with some form of stop lug which prevents the package blanks 4 from being pushed on further and which is so located that the package blanks 4 are correctly placed on the studs 5, when their inner edges rest against the said stop lugs.

It used to be customary for each stud 5 to be provided with a stop lug capable of being displaced along the stud as well as of being locked in position, but this made it necessary, when converting the machine from one package size to another, to change all the stop lugs individually, which wastes a lot of time, but with the aid of the arrangement in accordance with the invention such individual conversion is no longer necessary, and no action on the part of the machine operator is in fact required in order to change the position of the stop lugs when altering the package size.

The above mentioned automatic arrangement for the adjustment of the position of package blanks 4 on the studs 5 is characterised in that spaced, pivotable wings 63 are provided, which are so designed that they can be swivelled inward towards one side face of a stud 5 fed centrally towards the device, and the invention is further characterised in that the said wings are movably located on a common shaft 60 which is so designed as to be capable of causing a rotary movement in both directions of rotation, while the elements rigidly connected with shaft 60 support a carrier pin 75 which is designed to slide within a guide aperture 74 provided within the said wings 63 which are in addition subject to tension springs 65, these having the tendency of moving the wings 63 against the studs 5.

Figures 3, 4:
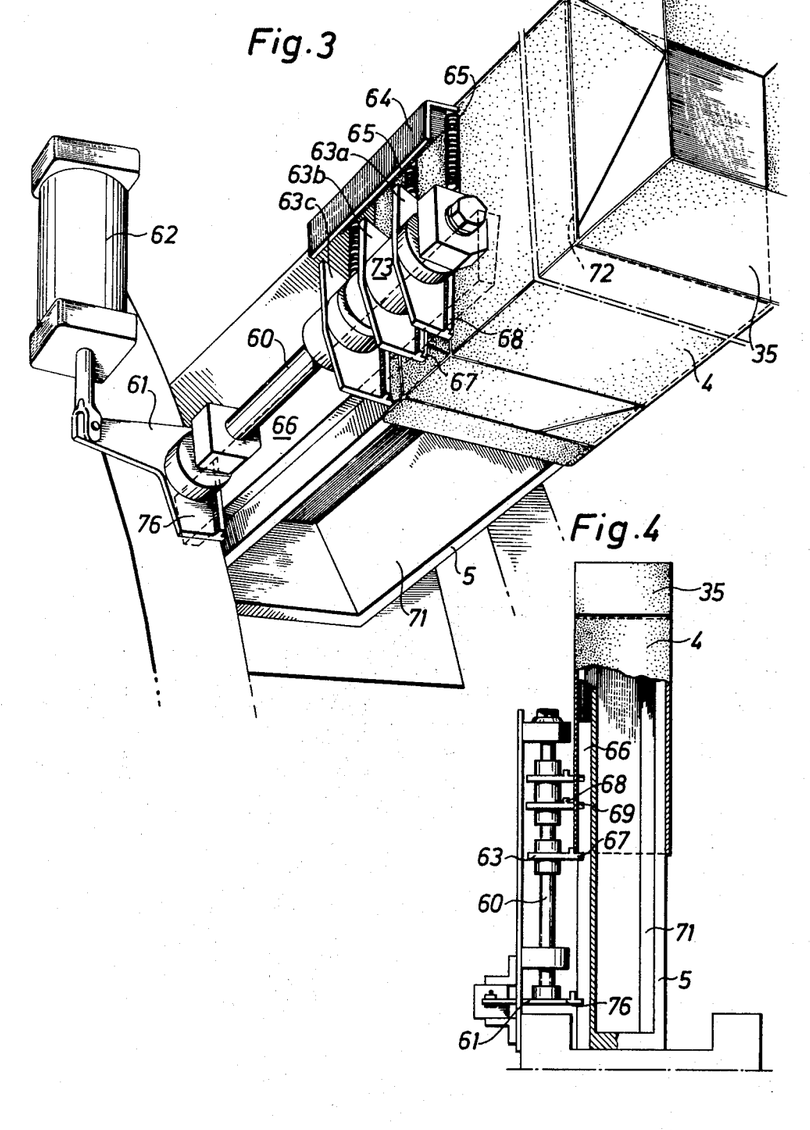
FIGS. 3, 3a and 4 show an automatic positioning device for the containers.
Figure 3A:
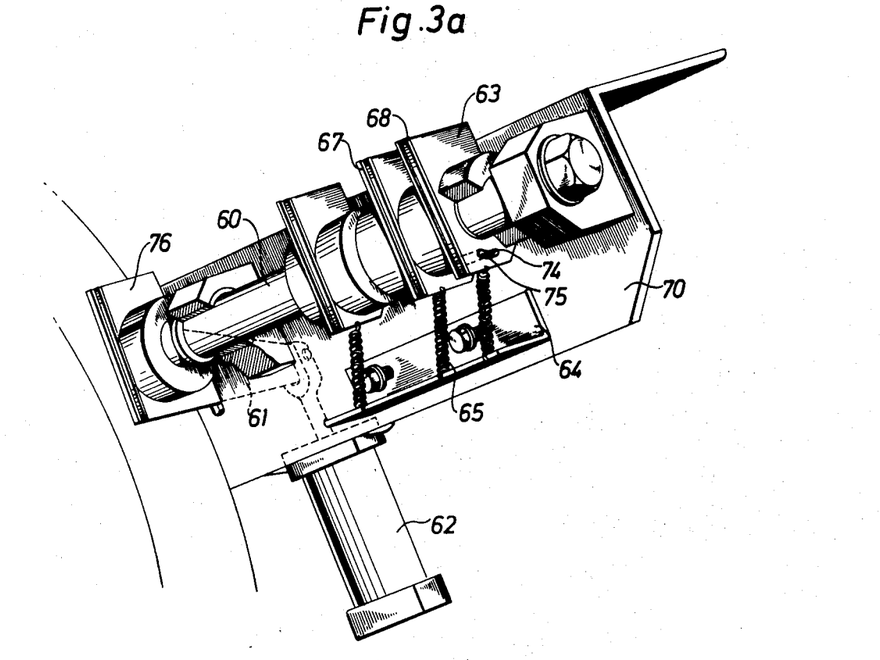

The said device or system for automatic adjustment of the position of the package blanks 4 on the studs 5 is shown in FIGS. 3, 3a and 4, and a more detailed description of this system and its function is given below with reference to these figures.

The side walls of the studs 5 are not plane but they are provided with recesses 71, and in one of these recesses of each of the studs is located a track 66 with a groove 69 which is transverse in respect of the longitudinal direction of the stud. The distance between each of these grooves and the front edge 72 defines the correct push-on length for the different package blank sizes. The automatic container positioning system or container stop itself is mounted on a beam 70 which is firmly connected with the machine frame, and it consists of a shaft 60 which can be actuated by means of a pneumatic cylinder 62, the said shaft 60 being joined to the actuating rod of the pneumatic cylinder by means of a rotatable arm 61. The shaft 60 is rotatably mounted within bearings fixed within the said beam 70, and shaft 60 supports a number of wings 63 which are capable of rotation in respect to the shaft. The wings 63 (a,b,c) are separated from each other by spacer rings 73 in such a way that each of the wings is placed centrally opposite the groove 69 and a stud 5 fed centrally towards the adjusting device, whereby each of wings 63 is associated with a special groove. In FIG. 3a one can see partly in cross-section how the wings 63 are provided with a long and narrow guide aperture 74 into which a pin 75 is introduced, which is firmly associated with shaft 60. Each of the movably arranged wings 63 is, in addition, connected with a section 64 by means of a tension spring 65, the said section 64 being firmly attached to beam 70. The rear end wing 76 is not movable in relation to shaft 60, unlike the wings described above, but it is firmly connected with the said shaft, and in the embodiment shown here, the end wing 76 consists of a part of arm 61.

The automatic container positioning system works as follows.

When a package blank 4 is mounted as the previously described station I on a stud 5 centrally set towards the feeder device, the feeder device is so adjusted that it does not move the package blank 4 entirely to the correct position but locates the package blank 4 a few millimetres too high on the stud 5. At the following station II the upper section 35 of the package blank is folded by means of a folding device 7 in the manner above described, and this folding operation causes the package blank to be subjected to a pressure which tends to push the package blank 4 further over the stud 5.

However, at station II there is the automatic adjusting device for locating the package blank 4 on stud 5, and before the folding device 7 exerts is pressure on the projecting section 35 of the package blank, the shaft 60 is turned, with the aid of pneumatic cylinder 62 and rotary arm 61 into a position, in which the wings 63 are swivelled inward towards the stud 5, the wings 63 being retained in the said swivelled inward position during the entire folding operation.

As the result of the turning movement of shaft 60, the pin 75 is turned from its front position in guide apertures 74 and, as the result, releases the wings 63, which with the aid of tension springs 65 are swivelled inward towards the stud 5 which has been fed forward. As can be seen in FIGS. 3 and 4, the two front wings 63 (a,b) impinch upon the wall surfaces of the mounted package blank 4, in the case here illustrated, and they are stopped by these surfaces which prevent further turning of the wings 63 (a,b). The third wing counted from the front (63 c), however, is not stopped by the package blank inasmuch as the latter is not pushed onto the stud 5 to such an extent that its front edge reaches this wing. Hence, the wing 63c is swivelled further towards stud 5, whereby the movement of the latter is finally stopped when the front part 67 of the wing reaches the bottom of groove 69 in track 66 which is associated with this wing.

When the package blank 4 is pressed further onto stud 5 during the immediately subsequent folding operation, the front edge of package blank 4 is pushed against wing 63c, as a result of which the crease 103 in the package blank are located in the correct position with respect to the front edge 72 of stud 5.

In order to achieve better control of the front edges of the package blank it is advisable to provide the wings 63 with a transverse rib 68 which is located over the front edge of the package blank, when the package blank 4 is pushed to its correct position on stud 5.

In the present example it may be assumed that the packaging machine is intended for the production of a package with a capacity of 2dl, 3dl, 5dl and 1l, whereby the wing 63a corresponds to a package blank for packages with a capacity of 2dl etc. The wing 76 which is not provided with a spring always corresponds to the package blank with the largest volume capacity, i.e., 1l in the present case.

It is, of course, not absolutely necessary to provide the wings 63 with ribs 68, nor is it necessary for each stud 5 to be associated with the above rib 66 which is provided with a groove, but it has proved valuable in practice to be able to control the front edge of the package blanks with these aids, particularly when the package blanks are made of thin material.

(B) BASE HEATING DEVICE

With packaging machines of the type previously described the base of the packages is formed by folding the sections 35 which form the base and project from the studs 5 towards each other with two of the opposite sections being folded between the remaining two opposite sections in the manner of a bellows. The sections 35 which form the base and are folded inward are retained in the folded-inward position by heating the thermoplastic lining of the package blank 4 in the region of sections 35 which form the base, until plastification occurs, whereupon the thermoplastic material lining the surfaces of the sections is bonded after folding by surface fusion so as to form a permanent seal.

The sections which are to be heated to the sealing temperature are, in this context, generally referred to as sections 35, but they consist, as can be seen from FIG. 9, of the outsides of the triangular sections 107 and 108, the outside and inside of the triangular foldback sections 109 and 110 and of the inside of the rectangular sections 106 and 105 with the exception of the triangular parts which as regards size and location correspond to the triangular sections 107 and 108. The system for heating the base-forming sections 35 of the package blanks is provided with a heating device by means of which heating air or gas can be blown against selectively chosen zones of the base-forming sections 35 of package blanks 4 with a view to activating the adhesive capacity of the thermoplastic lining within the said zones, and the said heating device is characterised in that it possesses a heating chamber in which air heated to a temperature above the plastification point of the thermoplastic material is supplied from a combustion chamber not shown here, wall plates bounding the said heating chamber, at least some of the said wall plates being provided with holes or ducts which are so designed as to pass through and direct a current of hot air coming from the heating chamber, and a deflector which is provided with a number of oblique wall surfaces, which are arranged to deflect the hot air current from at least some of the said holes or ducts so that this hot air current is given a substantially different direction than that in which it flowed directly after passing through the holes.

It is as such known to heat the base-forming sections of the package blanks 4 mounted on studs 5 by means of radiation heat or hot air which is blowm towards selected areas of the base-forming sections 35. The heating devices hitherto used have consisted of units which could be raised and lowered and were so arranged that they could be partly introduced into those parts of package blanks 4 which project from the studs 5. However, in certain bases it is difficult to arrange such movable heating devices and fixed heating devices have been used instead, but in this case it has been difficult to distribute the hot air to selected parts of the base-forming sections 35 in a suitable manner.

In the present case, this problem has been solved by providing the heating system with a deflector body 82 by means of which hot air flowing out through specially arranged holes 80 from the heating device is deflected by the deflection faces 81 of the deflector body 82 so that the hot air current is mainly directed towards the inside of sections 109 and 110 and to the inside of the outer parts of the rectangular sections 105 and 106 whereas the inner parts of the triangular sections 107 and 108 are not heated to any significant extent.

The outside of the triangular sections 107 and 108 as well as the triangular fold-back sections 109 and 110 are to be heated and this is achieved by means of special heating devices 86 which extend downward along the sides of the package blank 4.

Figure 5:
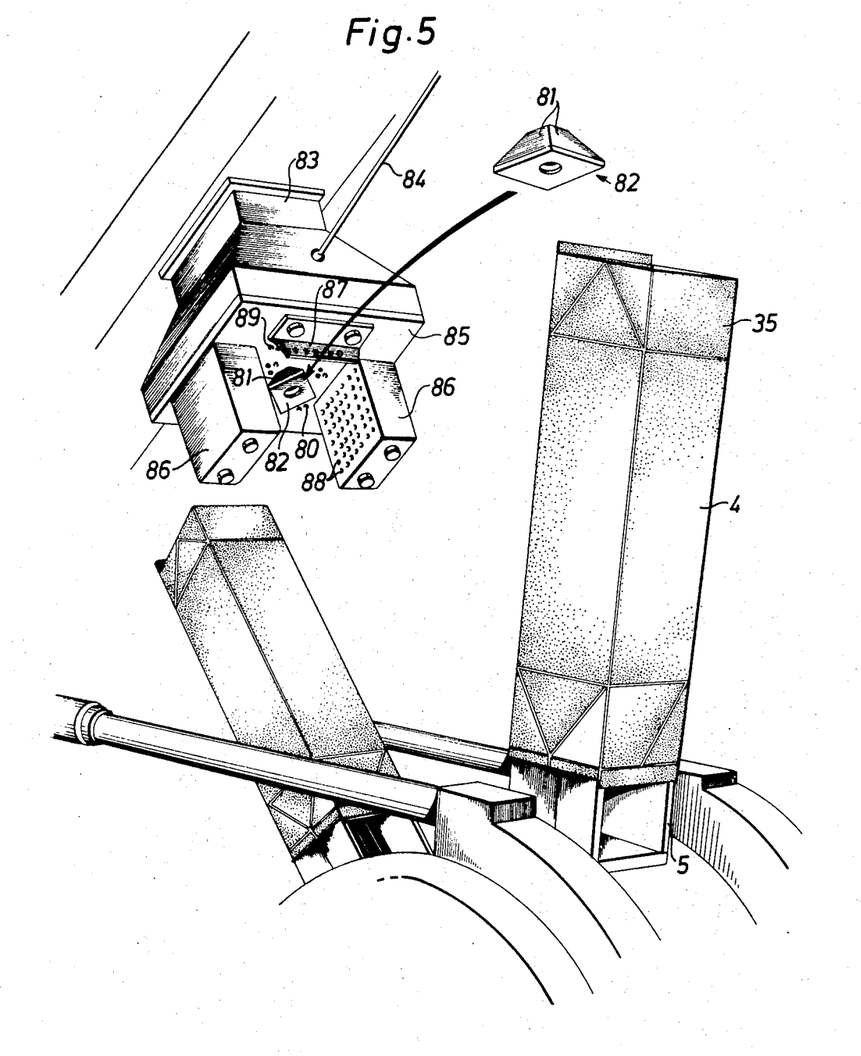
FIG. 5 shows a heating device.

The heating device in accordance with the invention is shown in FIG. 5, and the system consists of a heating chamber 83 mounted within the machine frame, which is supplied with hot air from a combustion chamber. The hot air is obtained by burning a combustible gas together with air in the said combustion chamber, whereupon the hot air supplied to the heating chamber 83 is blown out through the holes 80 which are arranged in one end wall 85 of the combustion chamber, whereby it is distributed in a suitable manner. The holes 80 are so arranged that the hot air currents emanating from the said holes 80 impinch on the deflecttor body 82 which is mounted on the end wall 85 in such a way that the deflector faces 81 deflect the air currents emanating from the holes 80 preferably at right angles and at the same time direct the said air currents towards basically four different directions towards the corner zones of the inside of a package blank 4 fed into the heating device. The outside of the triangular sections and the fold-back sections of the base-forming sections 35 is heated by means of a special heating device 86 through which hot air is delivered through the holes 88 towards the said faces of the base-forming sections 35 of the package blank.

If it is required for the edge zones of the shorter, rectangular section 105 (FIG. 9) to be heated on the surface of the section, a screen 87 is provided on the baseplate 85 of the heating device. A further row of holes 89 communicating with the heat chamber 83 is arranged directly next to the said screen 87, whereby the hot air currents emanating from the holes 89 are deflected by the screen 87 so as to impinch on the outside of the rectangular section 105 along the free edge of the said section.

The deflector 82 described above may advantageously consists of metal and should be so dimensioned that the package blank 4 mounted on the stud 5 can pass freely below the deflector 82 without touching the latter.

(C) BASE FOLDER

With packaging machines of the type here considered the bases of the packaging containers are formed by folding the base-forming sections 35 along a crease line pattern previously stamped into the package blank 4 as described above. In order to facilitate the folding operation, the crease lines are broken at station II as previously mentioned (see FIG. 1), whereupon selectd parts of the base-forming section 35 are heated at station III in order to make the thermoplastic lining capable of being sealed. At station IV the sections 35 folded towards each other are pressed together so as to form a durable joint.

As can be seen from the above description of the method of operation the base-forming sections 35 must be folded together between stations III and IV so that they can be picked up and pressed together between the pressure device 10 and the front face of stud 5 on which the package blank 4 is mounted, without being able to return to their initial position owing to their elasticity. This combining of folding operation may in certain cases be brought about by guide rails which gradually bring the rectangular sections 105 and 106 together, whereby the triangular sections 107 and 108 and the so-called fold-back sections 109 and 110 are folded under the sections 105 and 106 in the manner of a bellows. Folding together of the base-forming sections 35 with the aid of guide rails does, however, presuppose that the package blanks 4 are so arranged on the studs 5 that the rectangular sections 105 and 106 are oriented in the plane of movement of the studs 5. Such an orientation of the package blanks 4 is however not desirable in the present case since the containers 33 provided with the base would then be disadvantageously oriented during the subsequent filling and top sealing operations, and it is therefore necessary to make use of an entirely different design than the one embodying the said guide rails, which is characterised in that said device comprises a first and a second folding arm which are capable of being swivelled, both of the folding arms being rotatably located in a common base which is rigidly connected with the machine base while the said arms are mutually joined by means of a link rotatably located within the two folding arms, the said link being so arranged as to transmit the movement of the said first folding arm to the said other folding arm in such a way that the first folding arm will drive the second folding arm in the course of its motion. The folding device in accordance with the invention is further characterised in that the distance between the bearing point of the first folding arm and the bearing point of the said link in the folding arm is greater than the distance between the bearing point of the other folding arm and the bearing point of the link in the folding arm, and in that one of the two folding arms, preferably the first, is subject to the action of a tension spring which tends to keep the two folding arms separated.

Am embodiment of the folding device in accordance with the invention will be described below with reference to FIG. 6a, 6b and FIG. 7a, 7b and 7c in the attached diagrammatic drawing.

The folding device consists of two folding arms 90 and 91 which are rotatably fixed in a support plate 115 rigidly connected with the machine base, the position of the said support plate in relation to the machine base being capable of adjustment by means of setscrews 119. The folding arms 90 and 91 are connected with one another by means of a link 92, which at its ends is rotatably fixed within the two folding arms at the bearing points 116 and 117. Either one of the folding arms, preferably the folding arm 90, is connected with a tension spring 93 attached to the machine base, the said spring having the tendency of holding the folding arms in the position shown in FIG. 6a and 7a.

The points at which link 92 is attached to the folding arms are so arranged that the distance between bearing point 95 of folding arm 90 in the support plate 115 and the bearing point of folding arm 90 for link 92 is considerably larger than the distance between the bearing point 96 of folding arm 91 in the support plate 115 and the bearing point of folding arm 91 for the link 92.

Figure 6A:
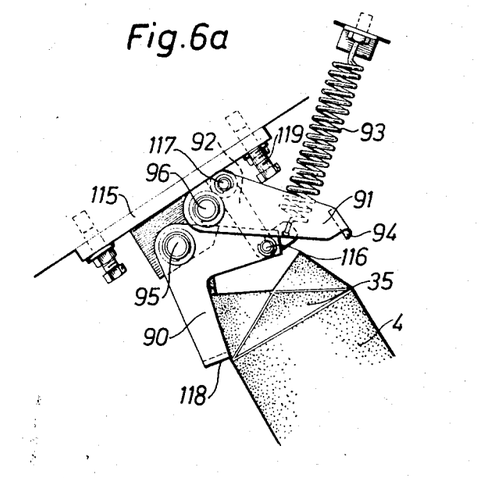
FIGS. 6a, 6b, 7a, 7b and 7c show a folding device.
Figures 7A, 7B, 7C:
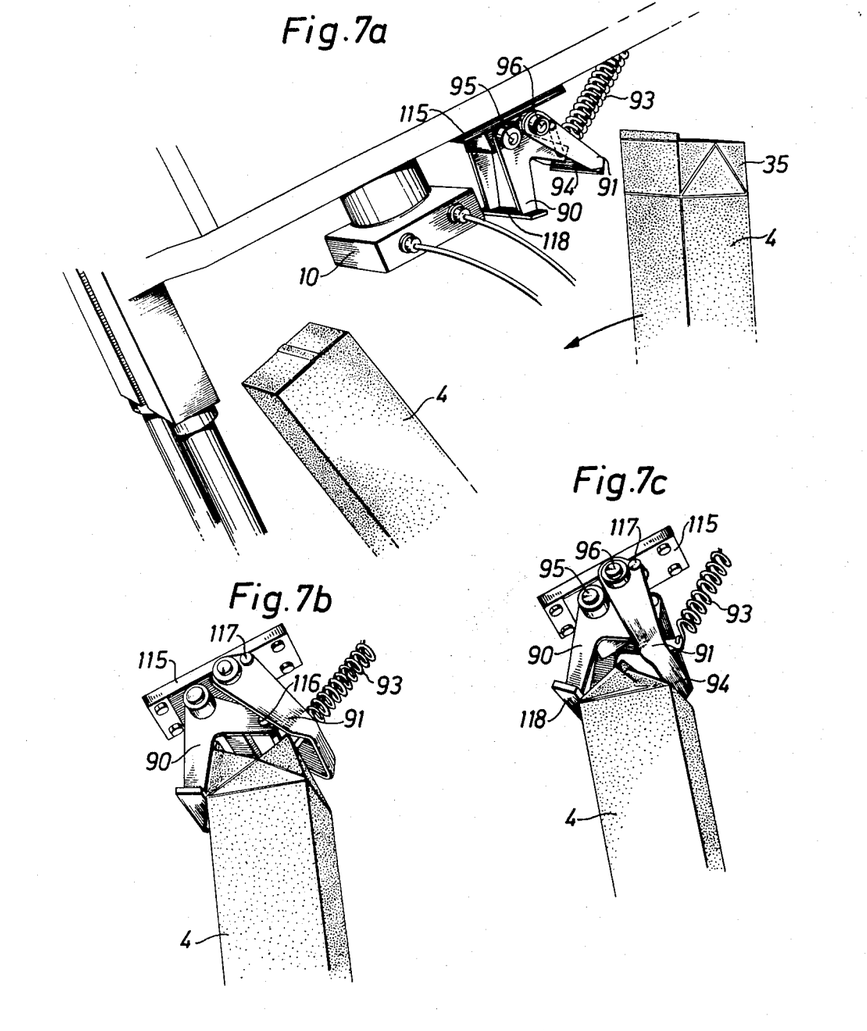

When the stud wheel moves in the direction of the arrow from station III to station IV, as shown in FIG. 7a, the studs 5 which do not support any package blank 4 can pass precisely under the folding device. However, if the studs 5 support package blanks 4, the front edge of the package blank in respect of the direction of movement impinches the edge 118 of folding arm 90 directly above the transverse crease line of the package blanks which separates the base-forming section 35 from the container body, as shown in FIG. 6a and 7b.

When the folding arms 90 is acted upon and displaced by the package blank 4, the folding arm 90 acts via the link 92 on the folding arm 91, which, as a result, is caused to turn in the same direction as folding arm 90. Since the bearing point 117 of link 92 in the folding arm 92 is very close to the centre of rotation of folding arm 91, the speed of rotation of folding arm 91 is considerably greater than the speed of rotation of folding arm 90, so that the folding arm 91 moves towards and approaches folding arm 90.

Since the base-forming sections 35 of the package blank 4 have been folded as previously described with a view to breaking the crease lines, the section (106 in FIG. 9) which impinches on edge 118 of the folding arm 90 is folded inward over the aperture of package blank 4 while at the same time the adjacent triangular sections and fold-back sections are folded inward over the base aperture of package blank 4 in the manner of a bellows.

Figure 6B:
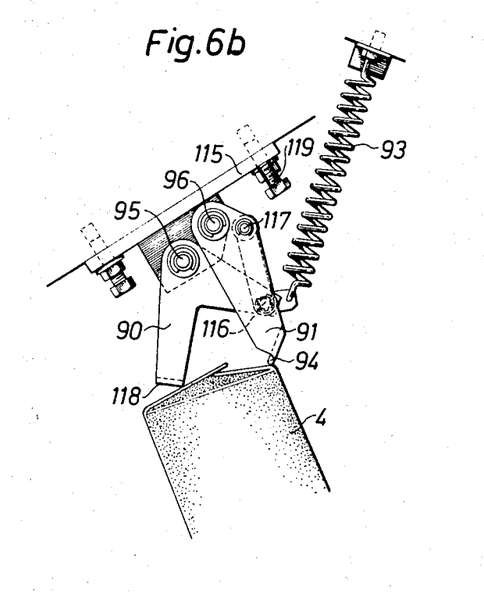

In order to simplify the folding process, the rear one of the rectangular sections (105 in FIG. 9) viewed in the direction of movement is acted upon, as shown in FIGS. 6b and 7c, by the striking edge 94 of folding arm 91, which depresses the rear rectangular section 105 at the same time as the front rectangular section 106 slides under edge 118 of the folding arm 90.

When the base-forming sections 35 are folded inward as shown e.g., in FIG. 6b, the stud 5 is moved under the pressure device 10 shown in FIG. 7a, which if pressed against the upper face of stud 5 with great force when the stud 5 is positioned below the pressure device, whereby the base-forming sections 35 which have been previously heated and folded towards one another are connected with one another and cooled to such an extent that the seal which has been obtained is mechanically durable.

Since during indexing the stud wheel 5 moves relatively quickly, it is important for the masses of the folding arms to be kept as small as possible, since otherwise the energy required for rapid displacement of the folding arm 90 becomes so great that the front edge of the package blank is deformed. The mass of the folding arms may be reduced, i.e.g, by providing recessed holes in the folding arms or by manufacturing the latter from a light material such as e.g. aluminum or plastic.

(D) TOP SEALING JAWS

When the containers 33 provided with a base are filled with the intended charge, certain sealing sections 112 (FIG. 9) are selectively heated whereupon the top-forming sections of the containers are folded together and the sealing sections are brought together and compressed between sealing jaws which, on the one hand, exert a high pressure on the sealing sections and, on the other hand, cool them so as to produce a durable and strong seal.

It is known to actuate sealing pressure jaws by means of pneumatic cylinders or similar devices, and these sealing jaws as such work well within reasonable limits of efficiency and safety, but they may occassionally disadvantageously owing to the fact that they require a relatively large space. E.g. with packaging machines of the type here considered which have twin-conveyor tracks 13, one endeavours to locate the tracks 13 as close to one another as possible so that the machine will not be too wide. A further reason why one wishes to locate the conveyor tracks 13 as close to one another as possible consists in that the processing stations along the conveyor tracks 13, i.e., the folding station, the filling station and the heating station, shall be capable of being equipped with working devices driven by means of drives which need not be duplicated at each station. The folding station, for instance, comprises two folding devices 25 at each conveyor track 13, i.e., altogether four folding devices, and these four folding devices 25 can be driven by means of a common drive rod 14 controlled by a cam disc 31. In the same way, the pumps of the filling system, which serve four filling nozzles 16, can be driven by a single drive, and the drive rods of the top heaters 17 are also driven by one and the same drive.

Figure 8:
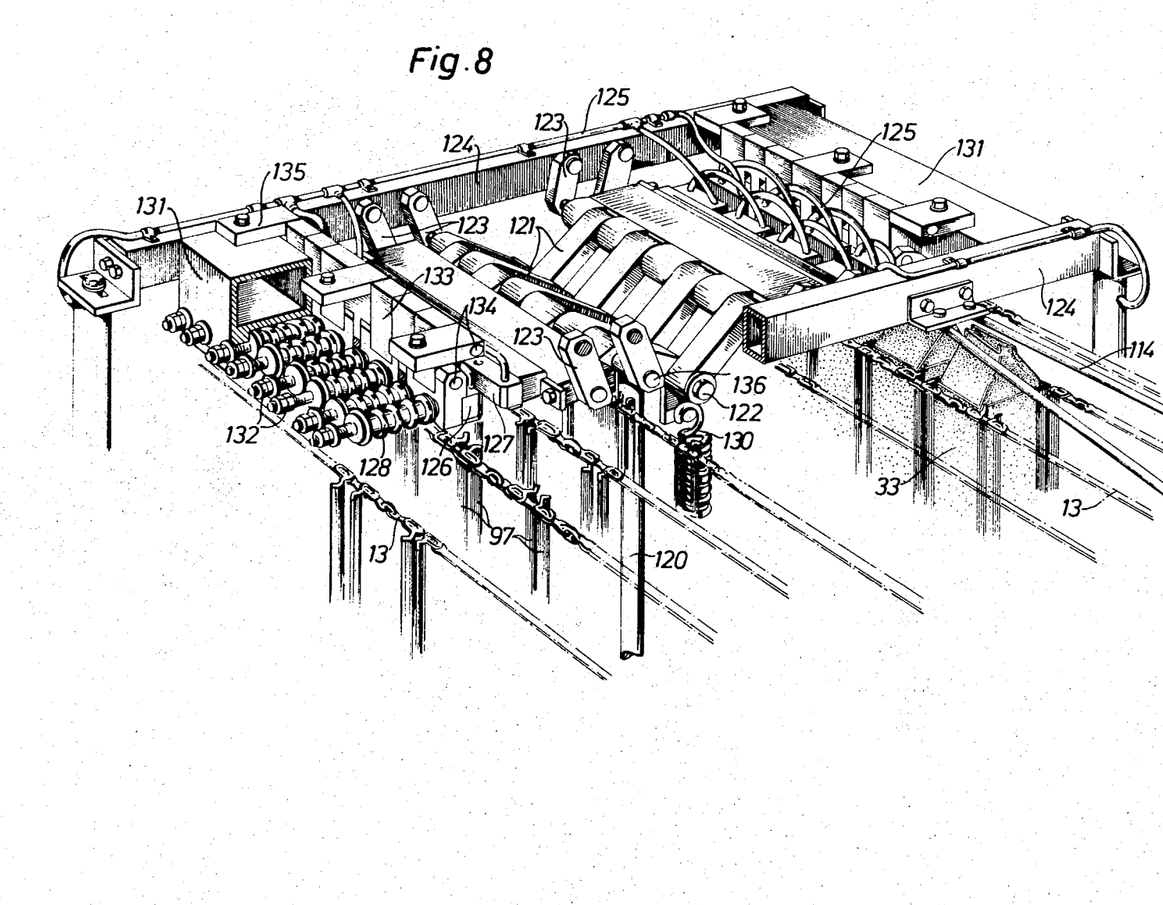
FIG. 8 shows a pressure jaw system.

The system shown in FIG. 8 for closing and sealing the tops of the filled packaging containers 33 comprises four pairs of pressure jaws 126, 127 for each conveyor track 13, i.e., altogether eight pairs of pressure jaws, all of which can be operated synchronously by means of a single actuator. The closing system in accordance with the invention is characterised in that it comprises two pairs of pressure jaws, each with one movable jaw 127 and fixed pressure jaw 126, the said pairs of pressure jaws being so arranged as to work synchronously, in that the movable pressure jaws of each pair of pressure jaws are connected with one another by means of link arms 121 which are rotatably located in either of the movable pressure jaws, and by a common, mainly horizontal shaft 122, which is so arranged as to be capable of movement to a first and a second position in the vertial plane, whereby the pairs of pressure jaws are closed when the said shaft is in its first, upper position, and the pressure jaws are open when the said shaft is in its lower, second position.

The sealing system in accordance with the invention will be described below in greater detail with reference to FIG. 8, which shows the two conveyor tracks 13 and the filled containers 33 located within the retaining devices in the conveyor tracks. The sealing system is fixed in a frame structure consisting of the members 124 and 131 which are firmly joined to the machine base. The fixed sealing jaws 126 are installed in the members 131 with the aid of compression springs 128, the spring force of which can be regulated by adjusting the nuts 132.

The fixed sealing jaws 126 are also suspended from the members 131 by means of links 133, which are joined, on the one hand, with the fixed jaws 126 and, on the other hand, with the mountings 135 which are firmly joined to the members 131. The movable sealing jaws 127 are suspended in links 123 which are arranged in pairs and capable of being swivelled, in such a way that the sealing jaws 127 are always horizontally orientated. The links 123 are not only attached to the movable jaws but also to the transverse members 124 of the frame structure. The four inner links 123, which are capable of being swivelled are connected with one another in pairs by means of a shaft 136, which, on the one hand, is rotatably rotated in the movable jaws 127 and, on the other hand, in the link arms 121. The link arms 121 are, in addition, rotatably joined by a shaft 122 at their other end, the said shaft passing through all the link arms 121. The shaft 122 is subject to a tension spring 130 which tends to move the shaft 122 downward, and the shaft 122 is, in addition, connected with an actuating rod 120, which is actuated with the aid of a cam disc 22.

The sealing jaws 126 and 127 are cooled with the aid of coolant which is supplied through lines 125, and since the sealing jaws are movable, it is advisable to make use of flexible hoses or pipe connections, at least in the case of the coolant lines which connect the sealing jaws with one another.

The sealing operation is effected by moving the filled containers 33 forward in stages by two retaining device divisions for each indexing motion, and by guiding the containers 33 between the guide rails 114, after heating their top sealing section, whereby the said guide rails combine the top forming sections in such a way that the sealing sections rest against one another. When the containers 33 are centrally between the sealing jaws, the actuating rod 120 is raised by means of the cam disc 22 not shown in FIG. 8, whereby shaft 122 is also raised in opposition to the spring force exerted by the tension spring 130. When the shaft 122 is raised with the aid of actuating rod 120, the link arms 121 are angularly displaced so that they assume a more horizontal position as a result of which the links 123 attached to the members 124 are swung to the side and consequently press the movable sealing jaws 127 against the fixed sealing jaws 126, whereby the sealing sections of the containers 33 which are between the sealing jaws 126 and 127 are compressed at high pressure and simultaneously cooled so that a tight and permanent seal is achieved.

Since it is possible for the thickness of the packaging material to vary somewhat, e.g., with different package sizes, it has been found advantageous to make the fixed sealing jaws 126 slightly resilient, since the cam control system has no natural flexibility. It is also possible, by making the fixed sealing jaws 126 resilient, to bring about a nearly constant pressure which can be adjusted by regulating the spring force of the springs 128, which can be adjusted with the aid of nuts 132. If the fixed sealing jaws are resilient, this of course gives rise to a certain lateral displacement of the upper sealing fins of containers 33, but since the resilience is very small, i.e., of the order of magnitude of one half mm, this does not result in any disadvantage. For controlling the fixed sealing jaws 126 they have been suspended in links 133.

As previously mentioned, each conveyor track 13 is provided with four pairs of sealing jaws, so that the containers 33 are exposed to two consecutive compressing operations in order to ensure adequate compression and cooling of the top seal, and the reaon for treating the filled containers 33 in this manner by two consecutive operations is that the available time between two consecutive indexing operations is not sufficient to achieve a seal of the required strength.

We claim:

1. In a packaging machine for the production of filled and sealed packages from package blanks of carton material having a lining of a thermoplastic material and including means for erecting package blanks into tubular form, means for forming and sealing the bottom of each erected blank, means for filling the bottom sealed erected blanks, means for conveying the filled erected blanks in two parallel lines, means for folding top closure elements of the erected filled blanks in each line to form opposed, parallel flap elements and means for heating the flaps of the folded top closure elements of the erected blanks to plasticize the thermoplastic lining of the flap elements, the improvement comprising means for sealing together the heated flaps of the top closure elements including at least one pair of sealing jaws for each of the two lines of filled erected blanks, one jaw of each pair being substantially fixed and disposed on the outside of the two parallel lines and the other of each pair of jaws being movable and disposed between the two parallel lines of filled erected blanks, means for cooling each pair of jaws, pairs of supporting links rotatably attached at one end of each supporting link to the ends of said movable jaws and at the other end of each supporting link to a fixed support, a horizontal shaft mounted between said pairs of movable jaws for vertical movement at right angles to its axis, link arms connecting each of said movable jaws to said shaft and means for moving said shaft reciprocally vertically whereby the movable jaws are moved laterally outwardly while being horizontally oriented by said pairs of supporting links toward said substantially fixed jaws to press said heated flaps firmly together to seal the top closure elements together and thus cool the sealed elements and close the filled package and are then moved laterally inwardly to open said pairs of jaws.

2. In a packaging machine as claimed in claim 1 which further comprises stiff compression springs mounted to permit limited horizontal movement of the substantially fixed jaws when said movable jaws move outwardly thereagainst.

* * * * *